(12) United States Patent
Suciu et al.

(10) Patent No.: US 9,157,325 B2
(45) Date of Patent: Oct. 13, 2015

(54) BUFFER COOLING SYSTEM PROVIDING GAS TURBINE ENGINE ARCHITECTURE COOLING

(75) Inventors: Gabriel L. Suciu, Glastonbury, CT (US); Ioannis Alvanos, West Springfield, MA (US); Camelia Galos, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 665 days.

(21) Appl. No.: 13/405,502

(22) Filed: Feb. 27, 2012

(65) Prior Publication Data

US 2013/0219918 A1   Aug. 29, 2013

(51) Int. Cl.
*F02C 6/08* (2006.01)
*F01D 5/08* (2006.01)
*F02C 7/06* (2006.01)
*F02C 7/18* (2006.01)

(52) U.S. Cl.
CPC . *F01D 5/081* (2013.01); *F02C 6/08* (2013.01); *F02C 7/06* (2013.01); *F02C 7/185* (2013.01)

(58) Field of Classification Search
CPC .............. F02C 7/18; F02C 7/185; F02C 6/08; Y02T 50/676; F01D 11/24; F04D 27/0207
USPC ......... 60/785, 795, 806, 728, 39.08, 266, 267
See application file for complete search history.

(56) References Cited

U.S. PATENT DOCUMENTS

| | | | |
|---|---|---|---|
| 4,561,246 A | 12/1985 | Hovan | |
| 4,574,584 A * | 3/1986 | Hovan | ............................. 60/782 |
| 4,709,545 A | 12/1987 | Stevens et al. | |
| 4,822,244 A * | 4/1989 | Maier et al. | ...................... 416/95 |
| 5,178,202 A | 1/1993 | Dannoura et al. | |
| 5,392,614 A | 2/1995 | Coffinberry | |
| 5,402,636 A | 4/1995 | Mize et al. | |
| 5,581,996 A | 12/1996 | Koch et al. | |
| 5,611,197 A * | 3/1997 | Bunker | ........................... 60/806 |
| 5,782,076 A * | 7/1998 | Huber et al. | .................... 60/782 |

(Continued)

FOREIGN PATENT DOCUMENTS

| | | |
|---|---|---|
| EP | 0570217 B1 | 10/1997 |
| EP | 0608142 B1 | 10/1999 |

(Continued)

OTHER PUBLICATIONS

International Search Report and Written Opinion of the International Search Authority for International application No. PCT/US2013/025507 dated Jun. 2, 2013.

(Continued)

*Primary Examiner* — Gerald L Sung
(74) *Attorney, Agent, or Firm* — Carlson, Gaskey & Olds

(57) ABSTRACT

A gas turbine engine includes a buffer cooling system having a first heat exchanger, a first passageway, a second passageway and a third passageway. The first heat exchanger exchanges heat with a bleed airflow to provide a conditioned airflow. The first passageway communicates a first portion of the conditioned airflow to a high pressure compressor of the gas turbine engine, the second passageway communicates a second portion of the conditioned airflow to a high pressure turbine of the gas turbine engine, and the third passageway communicates a third portion of the conditioned airflow to a low pressure turbine of the gas turbine engine.

6 Claims, 3 Drawing Sheets

(56) References Cited

U.S. PATENT DOCUMENTS

| | | | |
|---|---|---|---|
| 5,918,458 A * | 7/1999 | Coffinberry et al. | 60/785 |
| 6,050,079 A | 4/2000 | Durgin et al. | |
| 6,098,395 A * | 8/2000 | North | 60/782 |
| 6,124,646 A | 9/2000 | Artinian et al. | |
| 6,183,193 B1 | 2/2001 | Glasspoole et al. | |
| 6,250,061 B1 * | 6/2001 | Orlando | 60/772 |
| 6,267,553 B1 | 7/2001 | Burge | |
| 6,468,032 B2 | 10/2002 | Patel | |
| 7,000,404 B2 * | 2/2006 | Palmisano et al. | 60/782 |
| 7,114,339 B2 | 10/2006 | Alvanos et al. | |
| 7,562,519 B1 | 7/2009 | Harris et al. | |
| 7,823,389 B2 | 11/2010 | Seitzer et al. | |
| 8,056,345 B2 * | 11/2011 | Norris et al. | 60/785 |
| 8,061,969 B2 | 11/2011 | Durocher et al. | |
| 8,683,811 B2 * | 4/2014 | Clemen et al. | 60/782 |
| 2002/0076318 A1 | 6/2002 | Patel | |
| 2002/0148213 A1 | 10/2002 | Yu | |
| 2005/0111964 A1 | 5/2005 | Krammer et al. | |
| 2006/0285968 A1 | 12/2006 | Riahi et al. | |
| 2008/0112798 A1 | 5/2008 | Seitzer et al. | |
| 2008/0141678 A1 | 6/2008 | Brunet et al. | |
| 2008/0310955 A1 * | 12/2008 | Norris et al. | 415/178 |
| 2009/0010751 A1 | 1/2009 | McCaffrey et al. | |
| 2009/0019858 A1 | 1/2009 | Roberge | |
| 2009/0044543 A1 * | 2/2009 | Clemen et al. | 60/785 |
| 2010/0132370 A1 * | 6/2010 | Durocher et al. | 60/796 |
| 2010/0275612 A1 | 11/2010 | Smoke et al. | |
| 2011/0030386 A1 | 2/2011 | Kumar et al. | |
| 2011/0072832 A1 | 3/2011 | Blanchard et al. | |
| 2011/0079019 A1 | 4/2011 | Durocher et al. | |
| 2011/0088405 A1 | 4/2011 | Turco | |
| 2011/0126543 A1 | 6/2011 | Kirsopp et al. | |
| 2011/0271689 A1 | 11/2011 | Lacy et al. | |

FOREIGN PATENT DOCUMENTS

| | | |
|---|---|---|
| EP | 1890005 A2 | 2/2008 |
| EP | 1923539 A2 | 5/2008 |
| EP | 2374995 A2 | 10/2011 |

OTHER PUBLICATIONS

International Search Report and Written Opinion of the International Search Authority for International application No. PCT/US2013/025506 dated May 24, 2013.

International Search Report and Written Opinion of the International Search Authority for International application No. PCT/US2013/026766 dated May 29, 2013.

International Search Report and Written Opinion of the International Search Authority for International application No. PCT/US2013/026767 dated Jun. 4, 2013.

International Preliminary Report on Patentability for International application No. PCT/US2013/026766 dated Sep. 12, 2014.

International Preliminary Report on Patentability for International application No. PCT/US2013/025507 dated Sep. 12, 2014.

International Preliminary Report on Patentability for International application No. PCT/US2013/025506 dated Sep. 12, 2014.

International Preliminary Report on Patentability for International application No. PCT/US2013/026767 dated Sep. 12, 2014.

Written Opinion for Singapore Application No. 11201404760Y dated Jan. 14, 2015.

Intellectual Property Office of Singapore, Search Report and Written Opinion for Singapore Patent Application No. 1120140270R dated Jul. 9, 2015.

* cited by examiner

BUFFER COOLING SYSTEM PROVIDING GAS TURBINE ENGINE ARCHITECTURE COOLING

BACKGROUND

This disclosure relates to a gas turbine engine, and more particularly to a buffer cooling system that combines the use of multiple compartments of the gas turbine engine architecture to condition portions of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine loads.

Gas turbine engines channel airflow through the core engine components along a primary gas path. The airflow communicated along the primary gas path is typically of a relatively high operating temperature. The material properties of gas turbine engine hardware can limit the ability to operate the gas turbine engine using hotter, more aggressive gas path temperatures and cycles.

SUMMARY

A gas turbine engine includes a buffer cooling system having a first heat exchanger, a first passageway, a second passageway and a third passageway. The first heat exchanger exchanges heat with a bleed airflow to provide a conditioned airflow. The first passageway communicates a first portion of the conditioned airflow to a high pressure compressor of the gas turbine engine, the second passageway communicates a second portion of the conditioned airflow to a high pressure turbine of the gas turbine engine, and the third passageway communicates a third portion of the conditioned airflow to a low pressure turbine of the gas turbine engine.

In a further embodiment of the foregoing gas turbine engine embodiment, the buffer cooling system can include a second heat exchanger.

In a further embodiment of either of the foregoing gas turbine engine embodiments, the first passageway can be in fluid communication with a first nozzle assembly and the first portion of the conditioned airflow is communicated through an opening in the first nozzle assembly to condition hardware of the high pressure compressor.

In a further embodiment of any of the foregoing gas turbine engine embodiments, the second passageway can be in fluid communication with a second nozzle assembly and the second portion of the conditioned airflow is communicated through an opening in the second nozzle assembly to condition hardware of the high pressure turbine.

In a further embodiment of any of the foregoing gas turbine engine embodiments, the second portion of the conditioned airflow can be communicated through a bearing compartment of the gas turbine engine prior to entering the second passageway.

In a further embodiment of any of the foregoing gas turbine engine embodiments, the third passageway can be in fluid communication with a third nozzle assembly, and the third portion of the conditioned airflow is communicated through an opening in the second nozzle assembly to condition hardware of the low pressure turbine.

In a further embodiment of any of the foregoing gas turbine engine embodiments, the first portion of the conditioned airflow can be communicated in an upstream direction and each of the second portion and the third portion of the conditioned airflow can be communicated in a downstream direction.

In a further embodiment of any of the foregoing gas turbine engine embodiments, the third portion of the conditioned airflow can be communicated in both an upstream direction and a downstream direction.

In a further embodiment of any of the foregoing gas turbine engine embodiments, the second passageway can extend at least partially through a bearing system of the gas turbine engine.

In a further embodiment of any of the foregoing gas turbine engine embodiments, the third passageway can extend at least partially through a mid-turbine frame of the turbine engine.

In another exemplary embodiment, a gas turbine engine includes a high pressure compressor, a combustor downstream from the high pressure compressor, a high pressure turbine downstream from the combustor, a low pressure turbine downstream from the high pressure turbine, and a buffer cooling system. The buffer cooling system communicates a conditioned airflow to condition hardware of each of the high pressure compressor, the high pressure turbine and the low pressure turbine.

In a further embodiment of the foregoing gas turbine engine embodiment, the hardware can include a rotor assembly.

In a further embodiment of either of the foregoing gas turbine engine embodiments, the buffer cooling system can include at least two heat exchangers, a plurality of passageways and a plurality of nozzle assemblies.

In a further embodiment of any of the foregoing gas turbine engine embodiments, the plurality of nozzle assemblies can be tangential onboard injection (TOBI) nozzles.

In a further embodiment of any of the foregoing gas turbine engine embodiments, a mid-turbine frame can be positioned axially between the high pressure turbine and the low pressure turbine.

In yet another exemplary embodiment, a method of conditioning a gas turbine engine architecture includes removing heat from a bleed airflow to render a conditioned airflow, and communicating the conditioned airflow to condition hardware of each of a high pressure compressor, a high pressure turbine and a low pressure turbine of a gas turbine engine.

In a further embodiment of the foregoing method embodiment, the step of communicating the conditioned airflow can include communicating a first portion of the conditioned airflow in an upstream direction to condition hardware of the high pressure compressor, communicating a second portion of the conditioned airflow in a downstream direction to condition hardware of the high pressure turbine, and communicating a third portion of the conditioned airflow in a downstream direction to condition hardware of the low pressure turbine.

In a further embodiment of the foregoing method embodiments, the step of communicating the third portion can include communicating a portion of the third portion of the conditioned airflow in an upstream direction to condition the hardware of the high pressure turbine.

The various features and advantages of this disclosure will become apparent to those skilled in the art from the following detailed description. The drawings that accompany the detailed description can be briefly described as follows.

DETAILED DESCRIPTION

Figure 1:
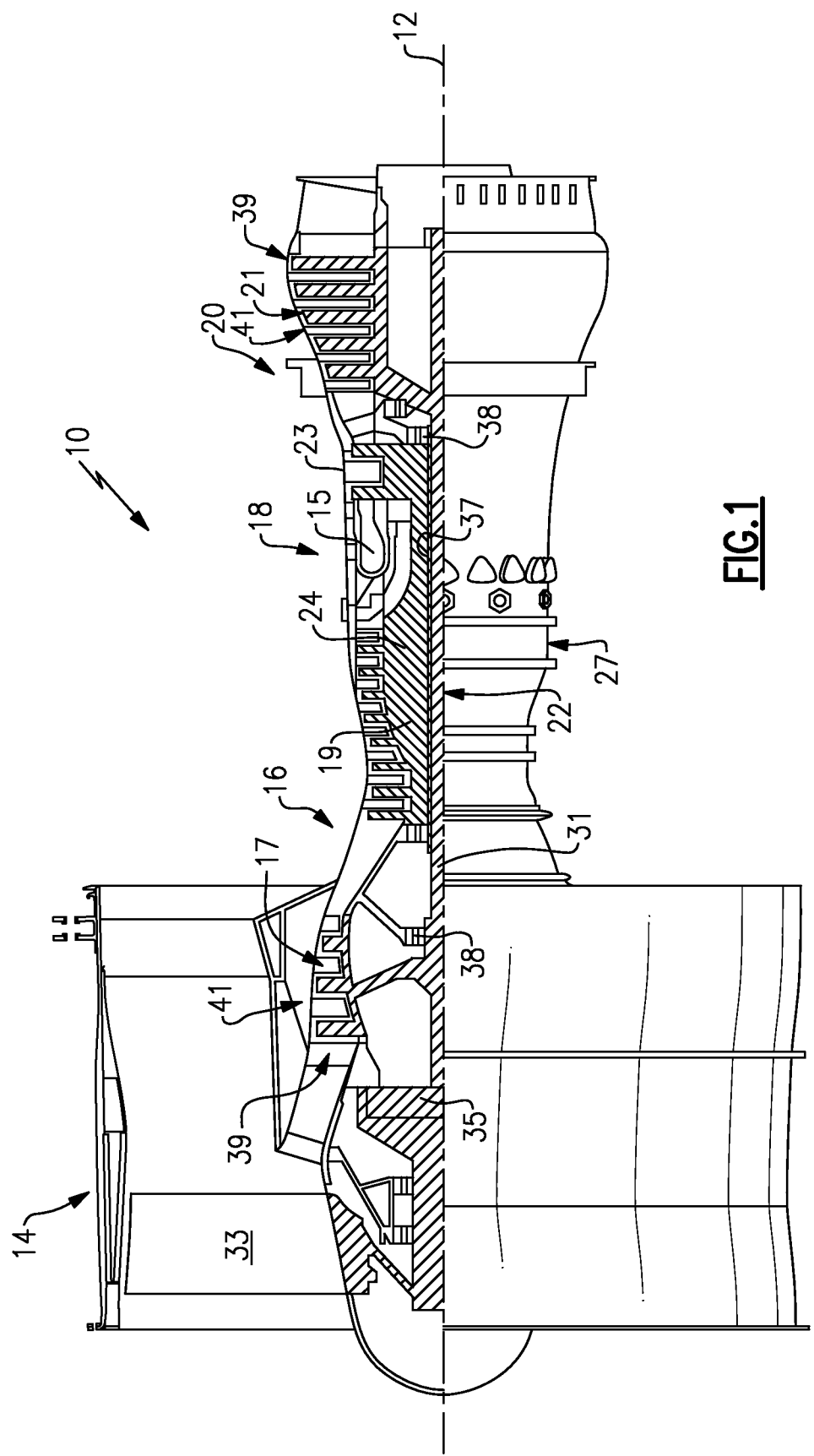
FIG. 1 schematically illustrates a cross-sectional view of a gas turbine engine.

FIG. 1 schematically illustrates a gas turbine engine 10. The example gas turbine engine 10 is a two spool turbofan engine that generally incorporates a fan section 14, a compressor section 16, a combustor section 18 and a turbine section 20. Alternative engines could include fewer or additional sections such as an augmenter section (not shown), among other systems or features. Generally, the fan section 14 drives air along a bypass flow path, while the compressor section 16 drives air along a core flow path for compression and communication into the combustor section 18. The hot combustion gases generated in the combustor section 18 are expanded through the turbine section 20. This view is highly schematic and is included to provide a basic understanding of the gas turbine engine 10 and not to limit the disclosure. This disclosure extends to all types of gas turbine engines and to all types of applications, including but not limited to, three spool turbofan configurations.

The exemplary gas turbine engine 10 of FIG. 1 generally includes at least a low speed spool 22 and a high speed spool 24 mounted for rotation about an engine centerline axis 12 relative to an engine static structure 27 via several bearing systems 38. The low speed spool 22 generally includes an inner shaft 31 that interconnects a fan 33, a low pressure compressor 17, and a low pressure turbine 21. The inner shaft 31 can connect to the fan 33 through a geared architecture 35 to drive the fan 33 at a lower speed than the low speed spool 22. Although the geared architecture 35 is schematically depicted between the fan 33 and the low pressure compressor 17, it should be understood that the geared architecture 35 could be positioned elsewhere within the gas turbine engine 10. The high speed spool 24 includes an outer shaft 37 that interconnects a high pressure compressor 19 and a high pressure turbine 23.

A combustor 15 is arranged between the high pressure compressor 19 and the high pressure turbine 23. The inner shaft 31 and the outer shaft 37 are concentric and rotate about the engine centerline axis 12. A core airflow is compressed by the low pressure compressor 17 and the high pressure compressor 19, is mixed with fuel and burned within the combustor 15, and is then expanded over the high pressure turbine 23 and the low pressure turbine 21. The turbines 21, 23 rotationally drive the low speed spool 22 and the high speed spool 24 in response to the expansion.

The compressor section 16 and the turbine section 20 can each include alternating rows of rotor assemblies 39 and vane assemblies 41. The rotor assemblies 39 carry a plurality of rotating blades, while each vane assembly 41 includes a plurality of vanes. The blades of the rotor assemblies 39 create or extract energy (in the form of pressure) from the airflow that is communicated through the gas turbine engine 10. The vanes of the vane assemblies 41 direct airflow to the blades of adjacent rotor assemblies 39 to either add or extract energy.

It should be understood that various bearing systems 38 could be positioned at alternative or additional locations of the gas turbine engine 10. The bearing systems 38, along with other gas turbine engine structures and systems, define internal compartments.

Figure 2:
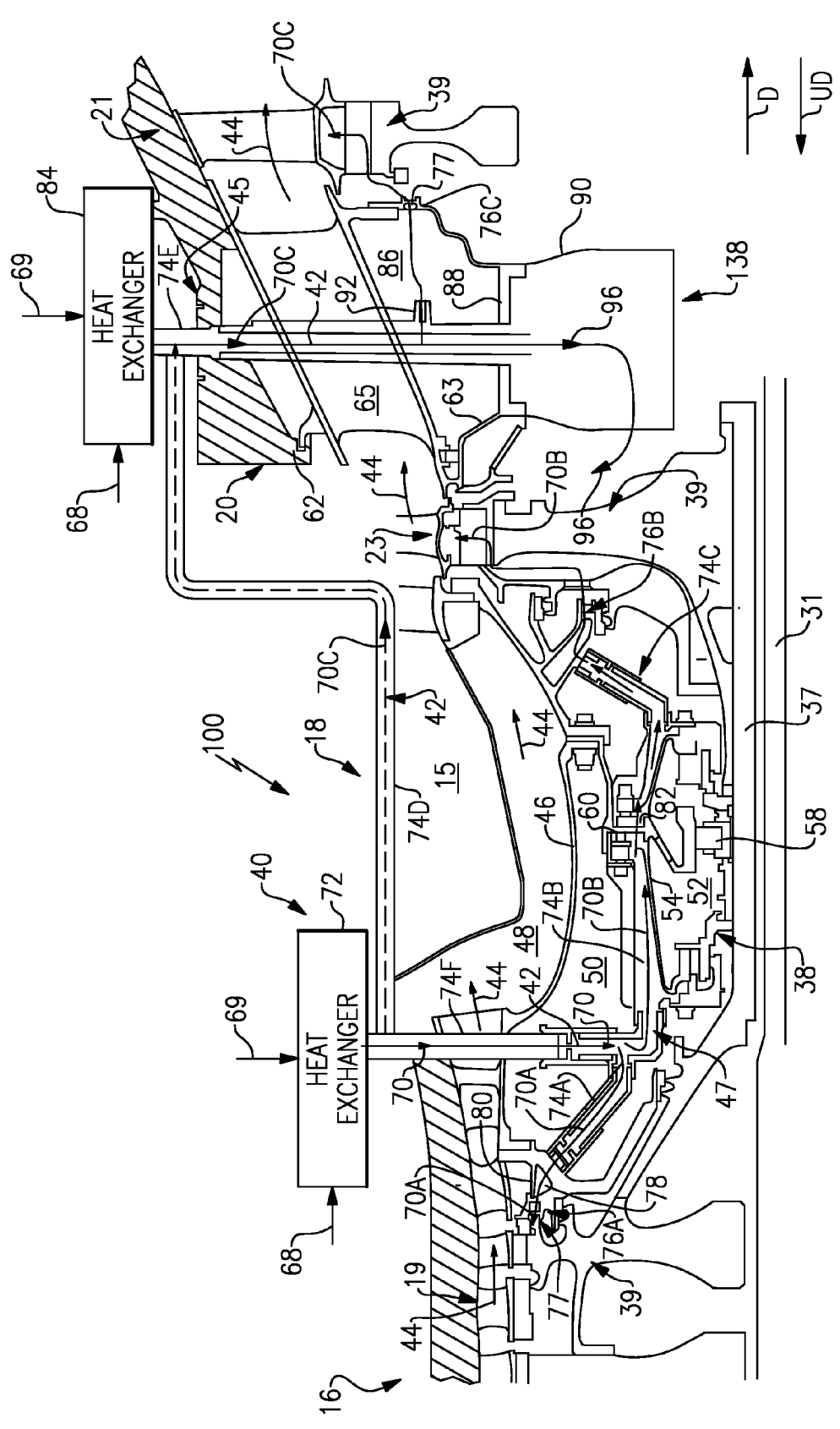
FIG. 2 illustrates a buffer cooling system that can be incorporated into a gas turbine engine.

FIG. 2 illustrates a portion 100 of a gas turbine engine, such as the gas turbine engine 10. In this example, the portion 100 encompasses parts of the compressor section 16, the combustor section 18 and the turbine section 20 of the gas turbine engine. More particularly, the portion 100 can encompass portions of the high pressure compressor 19, the combustor 15, the high pressure turbine 23 and the low pressure turbine 21. However, it should be understand that this disclosure could extend to other sections beyond what is shown by FIG. 2.

In the illustrated example, a diffuser case 46 extends radially inwardly from the combustor 15 and divides an interior 47 of the portion 100 into an outer cavity 48 and an inner cavity 50. A primary gas path 44 (for the communication of core airflow) can be communicated through the outer cavity 48, while a buffer cooling air path 42 extends at least partially through the inner cavity 50.

A bearing compartment 52 associated with a bearing system 38 is positioned radially inward from the diffuser case 46 within the inner cavity 50. A bearing housing 54 extends circumferentially about the outer shaft 37 to house a bearing 58 within the bearing compartment 52. A strut 60 extends between the diffuser case 46 and the bearing compartment 52. The strut 60 extends radially inwardly from the diffuser case 46 radially across a portion of the inner cavity 50. The bearing housing 54 circumferentially surrounds the bearing 58 to protect the bearing 58 and to confine any lubricant inside of the bearing compartment 52.

A mid-turbine frame 45 is positioned axially between the high pressure turbine 23 and the low pressure turbine 21. The mid-turbine frame 45 can support another bearing system 138 (shown schematically, but could include similar configuration as bearing system 38) that can be positioned radially inwardly from the mid-turbine frame 45. The mid-turbine frame 45 transfers bearing loads from the bearing system 138 to an outer engine casing. In other words, the mid-turbine frame 45 is a load bearing structure.

The mid-turbine frame 45 includes an outer casing 62, an inner casing 63 and a plurality of struts 65 that extend between the outer casing 62 and the inner casing 63. Although a single strut 65 is shown in FIG. 2, it should be understood that a plurality of struts 65 could be circumferentially disposed about the engine centerline axis 12. Bearing loads from the bearing system 138 can be communicated through the struts 65 to the outer casing 62, which can be either a separate structure from the outer engine casing or can be incorporated as part of the outer engine casing.

A buffer cooling system 40 can be incorporated into the portion 100 of the gas turbine engine 10 for communicating a conditioned airflow 70 throughout the gas turbine engine architecture along one or more buffer cooling air paths 42. In this disclosure, the term "conditioned airflow" includes both cooled and heated airflows. The buffer cooling system 40 can include a first heat exchanger 72, a plurality of passageways 74A-74F, and a plurality of nozzle assemblies 76A-76C (in this example, at least a first, second and third nozzle assembly) that are in fluid communication with one or more of the passageways 74A-74F. The nozzle assemblies 76A-76C can be fed with portions of the conditioned airflow 70 received from at least the first heat exchanger 72, as discussed in greater detail below. It should be understood that the buffer cooling system 40 could include any number of passages and nozzle assemblies, and this disclosure is not limited to the number of passages and nozzle assemblies illustrated in FIG. 2.

The first heat exchanger 72 of the buffer cooling system 40 can be mounted at any location of the gas turbine engine 10. One example non-limiting mounting location is at the outer engine casing. The heat exchanger 72 receives a bleed airflow 68, such as from the compressor section 16 or some other upstream location of the gas turbine engine 10, and exchanges heat between the bleed airflow 68 and another fluid medium 69 to render the conditioned airflow 70. One example fluid medium 69 includes airflow from the fan section 14. However, the heat exchanger 72 could be any heat exchanger including an air/air heat exchanger, a fuel/air heat exchanger or any other type of heat exchanger.

In the illustrated example, the buffer cooling system 40 can be used to simultaneously condition hardware of each of the high pressure compressor 19, the high pressure turbine 23 and the low pressure turbine 21 by communicating the conditioned airflow 70 along one or more buffer cooling air paths 42. The buffer cooling air paths 42 are separate from the primary gas path 44.

In this example, a passageway 74F radially extends between the first heat exchanger 72 and the bearing compartment 52 to communicate a conditioned airflow 70 into the interior 47 of the gas turbine engine 10. The passageway 74F is positioned axially between the high pressure compressor 19 and the combustor 15, in this example. A first portion 70A of the conditioned airflow 70 is communicated in an upstream direction UD through a passageway 74A that extends upstream from the passageway 74F. The first portion 70A of the conditioned airflow 70 is communicated into a compartment 78 (positioned just aft of the last stage of the high pressure compressor 19) that is established by the nozzle assembly 76A and a ring structure 80. The compartment 78 acts as a plenum for feeding the first portion 70A of the conditioned airflow 70 to the nozzle assembly 76A.

Figure 3:
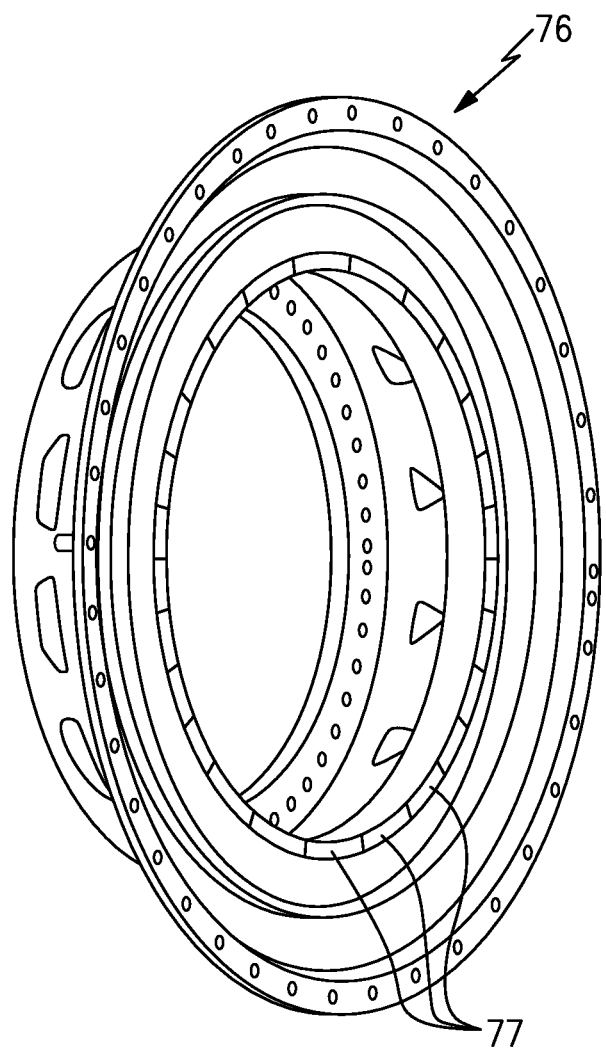
FIG. 3 illustrates an example nozzle assembly of the buffer cooling system of FIG. 2.

The nozzle assembly 76A communicates the first portion 70A of the conditioned airflow 70 in an upstream direction UD toward the high pressure compressor 19 and its associated hardware. The nozzle assembly 76A (as well as additional nozzle assemblies 76B, 76C that are discussed below) can include a tangential onboard injection (TOBI) nozzle or other suitable nozzle that is capable of communicating a conditioned airflow. An example nozzle assembly 76 (illustrative of nozzle assemblies 76A, 76B and 76C) is shown in FIG. 3. The TOBI nozzle imparts a swirling movement and directs the conditioned airflow tangentially onto hardware, such as a rotor assembly 39 of the high pressure compressor 19, for example. The nozzle assembly 76A can include one or more openings 77 for communicating the first portion 70A of the conditioned airflow 70. The conditioned airflow 70 can condition the disk, rim, web and blade of the rotor assembly 39, as well as other stages, parts and components.

The buffer cooling system 40 can also communicate a second portion 70B of the conditioned airflow 70 in a downstream direction D toward the high pressure turbine 23. In this example, the second portion 70B is communicated through a passageway 74B that extends at least partially through the bearing system 38. The passageway 74B extends (in the downstream direction D) from the passageway 74F that extends between the first heat exchanger 72 and the bearing compartment 52. The second portion 70B of the conditioned airflow 70 is communicated through the passageway 74B, through an opening 82 (or alternatively a series of openings) in the strut 60 of the bearing compartment 52 at a location that is radially outward from the bearing housing 54, and is then communicated through another passageway 74C. The passageway 74C feeds the second portion 70B of the conditioned airflow 70 to a nozzle assembly 76B, which communicates the second portion 70B of the conditioned airflow 70 onboard of hardware, such as a rotor assembly 39 of the high pressure turbine 23. The second portion 70B of the conditioned airflow 70 can be used to condition the disk, rim, web and blade of the rotor assembly 39, as well as other stages, parts and components.

The buffer cooling system 40 can additionally communicate a third portion 70C of the conditioned airflow 70 to condition portions of the low pressure turbine 21 (and optionally can provide additional or alternative conditioning to the high pressure turbine 23). The third portion 70C of the conditioned airflow 70 can be communicated through a passageway 74D that extends between the first heat exchanger 72 and the mid-turbine frame 45. Alternatively, the buffer cooling system 40 can optionally include a second heat exchanger 84 positioned relative to the mid-turbine frame 45 and operable to communicate the third portion 70C of the conditioned airflow 70 through a passageway 74E (or multiple passageways) that extends radially through at least a portion of the mid-turbine frame 45. The second heat exchanger 84 can be substantially similar to the first heat exchanger 72 and can be mounted at any location, including but not limited to, the outer engine casing. It should be understood that the buffer cooling system 40 could incorporate only a single heat exchanger or could include multiple heat exchangers.

The third portion 70C of the conditioned airflow 70 is communicated through the passageway 74E (which can extend radially through the strut 65) and into a cavity 86 (through an opening 92 in the passageway 74E) that is established by an outer wall 88 of a bearing housing 90 of the bearing system 138, an inner casing 63 of the mid-turbine frame 45 and the nozzle assembly 76C. The cavity 86 acts as a plenum for feeding the third portion 70C of the conditioned airflow 70 to the nozzle assembly 76C. The nozzle assembly 76C can include a tangential onboard injection (TOBI) nozzle, or other suitable nozzle, that is capable of communicating a conditioned airflow.

The nozzle assembly 76C communicates the third portion 70C of the conditioned airflow 70 in a downstream direction D toward the low pressure turbine 21 and its associated hardware. From the cavity 86, the third portion 70C of the conditioned airflow 70 can be communicated through one or more openings 77 of the nozzle assembly 76C onboard of hardware, such as a rotor assembly 39 of the low pressure turbine 21. The third portion 70C of the conditioned airflow 70 can be used to condition the disk, rim, web and blade of the rotor assembly 39, as well as other stages, parts and components. Optionally, a portion 96 of the third portion 70C of the conditioned airflow 70 can be communicated through the bearing system 138 and then in the upstream direction UD to condition portions of the high pressure turbine 23 from a downstream side of the high pressure turbine 23. The portion 96 can be communicated in addition to or instead of the second portion 70B of the conditioned airflow.

The various passageways 74A-74F can include tubing, ducting or other conduits that are capable of communicating a conditioned airflow through the gas turbine engine 10. It should be understood that the passageways 74A-74F are not necessarily shown to the scale they would be in practice. Rather, in the illustrated embodiments, the passageways 74A-74F are enlarged to better illustrate their features. The passageways 74A-74E could also be positioned at other locales of the portion 100 besides those depicted in FIG. 2 and the buffer cooling system 40 could include a greater or fewer number of passages.

The buffer cooling system 40 combines the use of multiple cooling compartments (i.e., the high pressure compressor 19, the high pressure turbine 23 and the low pressure turbine 21) into single system to condition various hardware of the gas turbine engine 10. The buffer cooling system 40 provides a system approach for conditioning multiple compartments of the gas turbine engine 10.

Although the different examples have a specific component shown in the illustrations, embodiments of this disclosure are not limited to those particular combinations. It is possible to use some of the components or features from one of the examples in combinations with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a buffer cooling system including:
a first heat exchanger that exchanges heat with a bleed airflow to provide a conditioned airflow;
a first passageway that communicates a first portion of said conditioned airflow to a high pressure compressor of said gas turbine engine;
a second passageway that communicates a second portion of said conditioned airflow to a high pressure turbine of said gas turbine engine;
a third passageway that communicates a third portion of said conditioned airflow to a low pressure turbine of said gas turbine engine, wherein each of said first passageway, said second passageway and said third passageway is in fluid communication with a tangential onboard injection nozzle,
wherein said second passageway is in fluid communication with a second nozzle assembly, and said second portion of said conditioned airflow is communicated through an opening in said second nozzle assembly to condition hardware of said high pressure turbine; and
wherein said second portion of said conditioned airflow is communicated through a bearing compartment of said gas turbine engine prior to entering said second passageway.

2. A gas turbine engine, comprising:
a high pressure compressor;
a combustor downstream from said high pressure compressor;
a high pressure turbine downstream from said combustor;
a low pressure turbine downstream from said high pressure turbine;
a buffer cooling system that communicates a conditioned airflow to condition hardware of each of said high pressure compressor, said high pressure turbine and said low pressure turbine; and
a mid-turbine frame positioned axially between said high pressure turbine and said low pressure turbine, wherein a portion of said conditioned airflow is communicated through said mid-turbine frame prior to conditioning portions of said high pressure turbine and said low pressure turbine.

3. The gas turbine engine as recited in claim 2, wherein said hardware includes a rotor assembly.

4. The gas turbine engine as recited in claim 2, wherein said buffer cooling system includes at least two heat exchangers, a plurality of passageways and a plurality of nozzle assemblies.

5. The gas turbine engine as recited in claim 4, wherein said plurality of nozzle assemblies are tangential onboard injection (TOBI) nozzles.

6. The gas turbine engine as recited in claim 2, wherein said portion of said conditioned airflow is communicated through a strut of said mid-turbine frame and then through an opening of a passageway into a cavity, said cavity feeding into a nozzle assembly.

* * * * *